June 10, 1958 C. J. SMITH 2,838,651
APPARATUS FOR MAKING AND WELDING CAN BODIES
Filed July 23, 1956 3 Sheets-Sheet 1
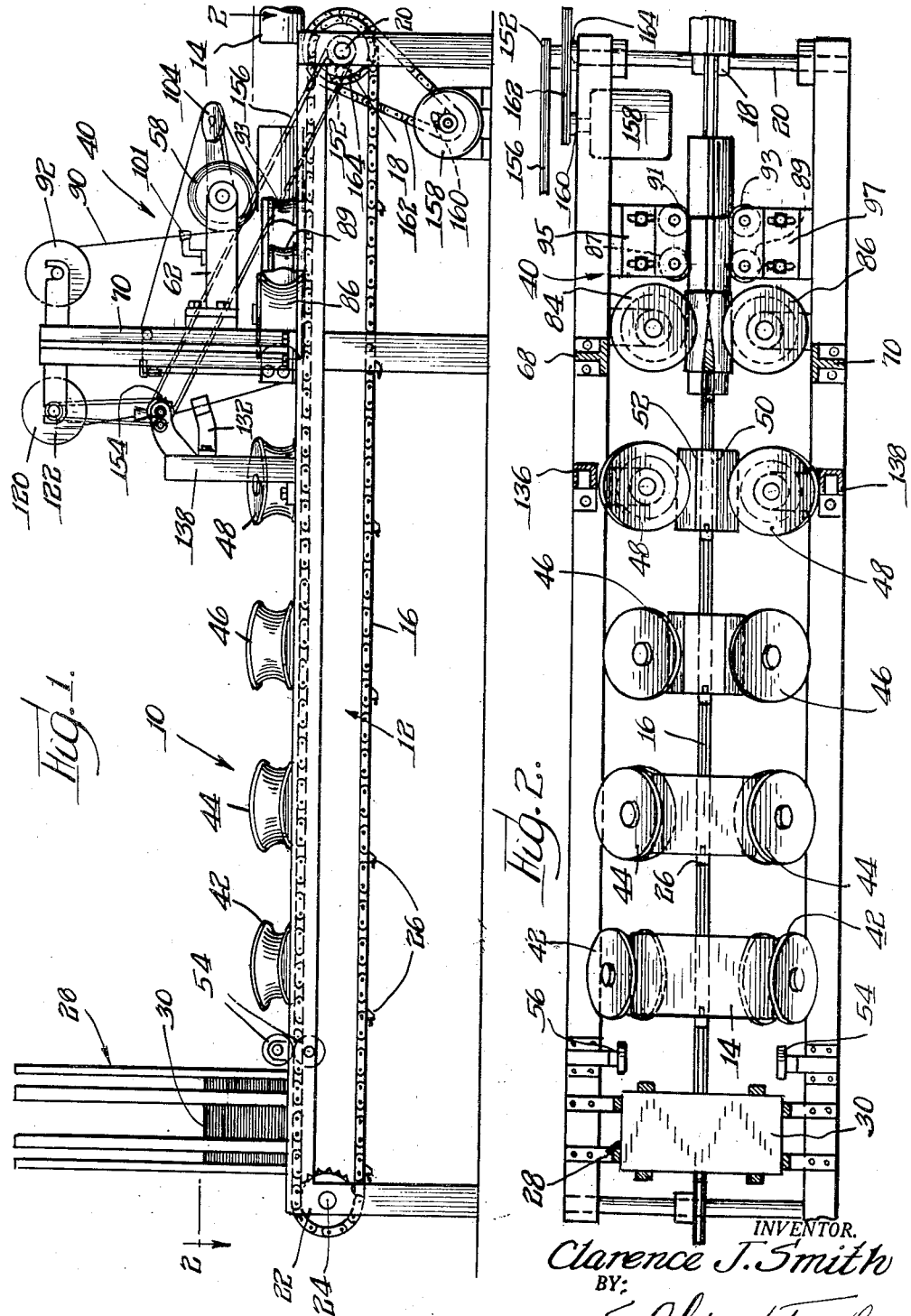
INVENTOR.
Clarence J. Smith
BY:
Olson & Trexler
attys.

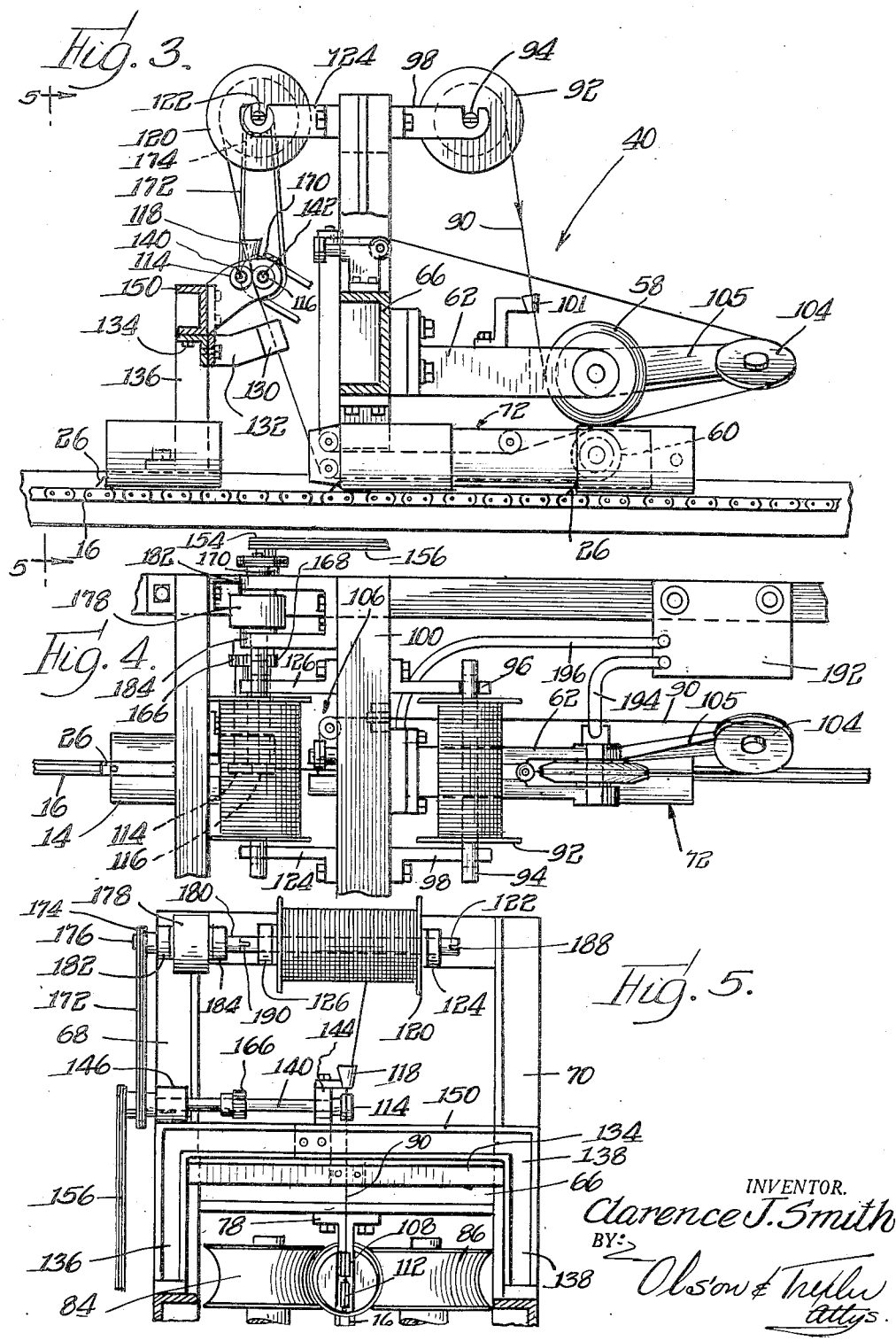

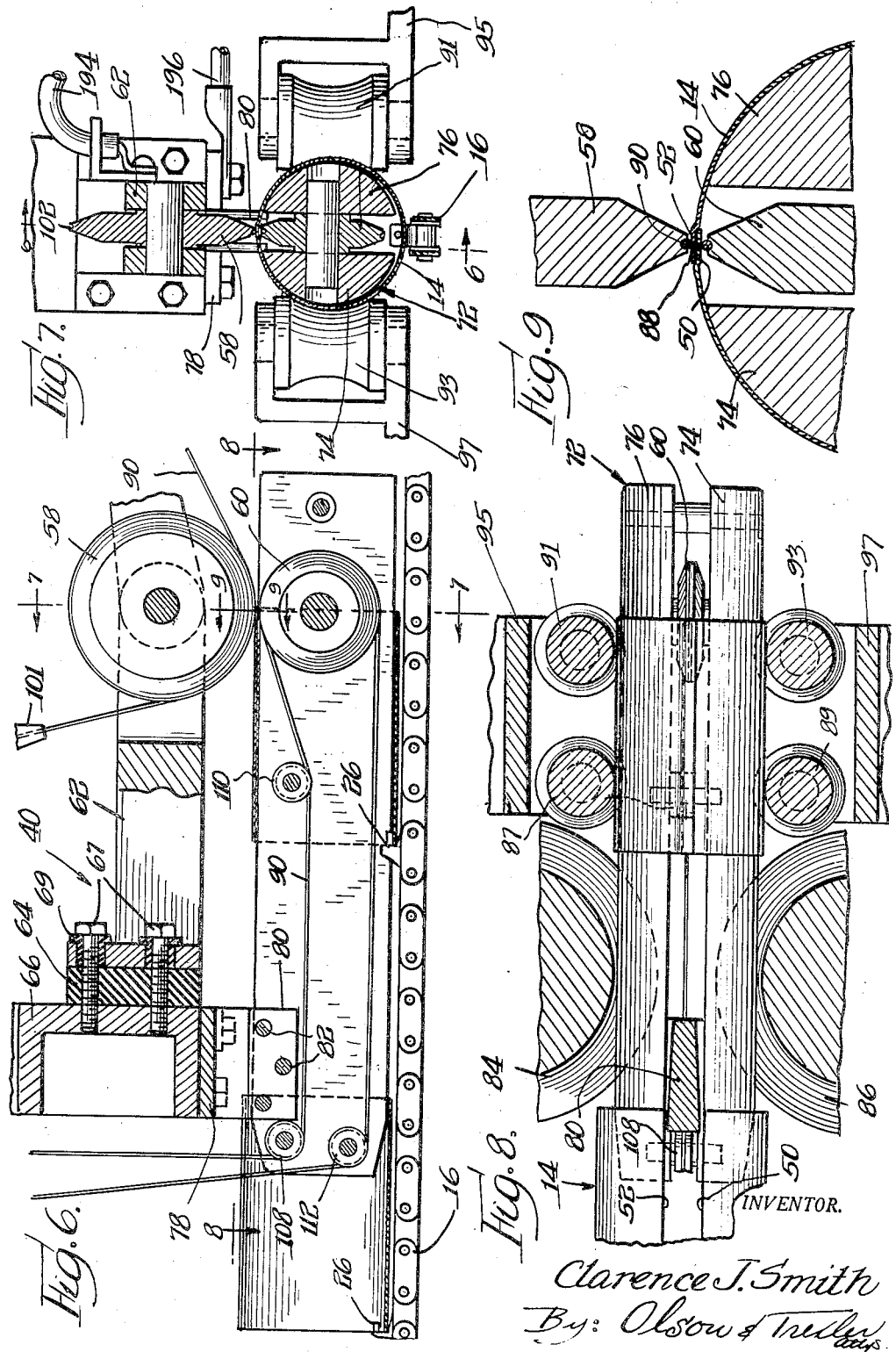

United States Patent Office 2,838,651
Patented June 10, 1958

2,838,651

APPARATUS FOR MAKING AND WELDING CAN BODIES

Clarence J. Smith, Rockford, Ill., assignor to W. F. and John Barnes Company, Rockford, Ill., a corporation of Illinois Application July 23, 1956, Serial No. 599,441

9 Claims. (Cl. 219—64)

The present invention relates to a novel apparatus for making can bodies or the like.

The can making industry has long pursued the problem of attempting to reduce or eliminate the quantity of solder usually required for securing side seams of can bodies. In attempts to solve this problem, a great many suggestions have heretofore been made. For example, it has been suggested that solderless side seams be provided by mechanically interlocking the longitudinal margins of a can body and substituting a sealing compound for a solder, and it has also been suggested that the side seams be welded instead of soldered. Such prior proposals have usually not been suitable for high speed production and, therefore, have not been generally used commercially. With particular reference to prior proposals for welding side seams, one difficulty has been that reliable substantially continuous welds could not be formed along side seams of successive can bodies sufficiently fast enough to enable a production rate to be obtained which is commercially competitive with the higher production rates of presently conventional methods using soldered side seams.

An important object of the present invention is to provide a novel apparatus for producing tubular bodies such as cans or the like having welded side seams at a rate which equals or exceeds production rates of can body making machinery now in use.

A more specific object of the present invention is to provide a novel apparatus whereby can bodies having relatively strong and leakproof side seams may be produced at high rates, for example, 600 can bodies per minute or more, and whereby the can bodies require no solder and less tin plate than can bodies of a corresponding size formed in accordance with the usual present commercial practices.

Another object of the present invention is to provide a novel apparatus of the above described type for producing can bodies or the like by welding the side seams thereof, which apparatus is of relatively simple and rugged construction and may be economically produced and maintained.

Other objects and advantages of the present invention will become apparent from the following description and the accompanying drawings wherein:

Fig. 1 is a simplified side elevational view of an apparatus incorporating the features of the present invention;

Fig. 2 is a simplified plan view of the novel apparatus;

Fig. 3 is an enlarged fragmentary side elevational view showing a portion of the novel apparatus for welding side seams of can bodies or the like;

Fig. 4 is an enlarged fragmentary plan view of a portion of the apparatus shown in Fig. 3;

Fig. 5 is a fragmentary cross sectional view taken along line 5—5 in Fig. 3;

Fig. 6 is an enlarged fragmentary partial sectional view taken along line 6—6 in Fig. 7;

Fig. 7 is a fragmentary sectional view taken along line 7—7 in Fig. 6;

Fig. 8 is a fragmentary sectional view taken along line 8—8 in Fig. 6; and

Fig. 9 is an enlarged fragmentary sectional view taken along line 9—9 in Fig. 6.

Referring now more specifically to the drawings wherein like parts are designated by the same numerals throughout the various figures, an apparatus 10 incorporating the features of the present invention is shown in simplified form in Figs. 1 and 2 and comprises a main frame generally designated by the numeral 12 and preferably disposed horizontally. The apparatus is adapted to handle previously cut can body blanks 14, and in order to feed the blanks longitudinally of the main frame along a predetermined path of travel, a conveyor chain 16 is provided. The chain extends around a drive sprocket 18 fixed on a rotatably supported shaft 20 adjacent the forward end of the frame and also around an idler sprocket 22 mounted on a shaft 24 adjacent the rearward end of the main frame. Feed dogs 26 are carried by the chain 16 at predetermined equal intervals, which dogs may be of any suitable type adapted securely to retain trailing edges of the can blanks and to feed the blanks positively. Adjacent the rearward end of the conveyor, means 28 is provided which is adapted to receive a stack or supply 30 of the blanks 14 and to feed the blanks successively onto the conveyor chain. Since the sheet or blank feeding means 28 forms no part of the present invention, it need not be described in detail and it suffices to state that the feeding means 28 may be of any suitable type capable of successively feeding the blanks at high speeds and in timed relationship with the conveyor chain so that successive blanks are engaged by successive feed dogs on the chain.

Means 40 is provided at a work station adjacent the conveyor chain 16 and spaced from the sheet feeding means 28 for forming side seams of can bodies or the like in the manner described below. In advance of the means 40 pairs of rollers 42, 44, 46 and 48 are spaced along opposite sides of the path of travel of the blanks 14 for successively forming the blanks into substantially tubular bodies. However, it should be noted that the rollers 48 immediately adjacent the means 40 are formed so that opposite longitudinal marginal portions 50 and 52 of the blanks leaving these rollers are still spaced apart. A preferred form of an ultimate side seam is shown best in Fig. 9, in which side seam the marginal portions 50 and 52 are disposed in overlapping relationship and are oppositely laterally offset from the remainder of the can body so that the exterior of the can body will be relatively smooth. The marginal portions 50 and 52 may be laterally offset in this manner while the blank is still in a flat condition by pairs of cooperable forming rollers 54 and 56 respectively disposed at opposite sides of the conveyor chain 16 and in advance of the rollers 42.

The means 40 is constructed for closing side seams of partially preformed can bodies and for sealing the side seams by welding while the bodies are moving continuously and at high speeds. To accomplish this, the means 40 is provided with upper and lower resistance welding roller electrodes 58 and 60. The upper electrode is rotatably carried by a bracket 62 that is separated by a block 64 of insulating material from a frame member 66. Bolts or the like 67 are insulated from the bracket by bushings 69 and connect the bracket to the transverse frame member 66 which, in turn, is connected to and supported by opposite upstanding side frame members 68 and 70.

A horn 72 is provided for supporting the lower electrode 60, which horn includes a pair of spaced apart and interconnected elongated members 74 and 76 rotatably receiving the electrode 60 therebetween and combining to provide a horn with a substantially cylindrical configuration. The horn 72 is supported only adjacent its rearward end by a bracket 78 connected to the transverse frame member 66 and having a depending narrow flange 80 extending between the horn members 74 and 76 and secured thereto by a plurality of screws or the like 82. Forming rollers 84 and 86 are respectively disposed at opposite sides of the horn and between the horn supporting bracket and the electrodes for successively bending partially preformed can bodies advancing beyond the depending flange 80 around the horn so that opposite margins 50 and 52 of each can body are disposed in overlapping relationship for presentation to the roller electrodes. Pairs of rollers 87—89 and 91—93 are provided for confining the can bodies during welding of the side seams. Rollers 87 and 91 are carried by a bracket 95 and rollers 89 and 93 are carried by a bracket 97, which brackets are laterally adjustably mounted as shown in Fig. 2 to enable the rollers to accommodate different sizes of cans. Preferably, the outer diameter of the horn 72 is similar to but slightly less than the internal diameter of a can body being formed so that the can body will be properly formed and will be freely slidable along the horn. As shown best in Figs. 6 and 7, the space between the horn members 74 and 76 accommodates the feed dogs 26 on the conveyor chain so that the can bodies remain under positive control of the conveyor chain at all times.

As overlapping side seam portions 50 and 52 of a can body are passed between the roller electrodes 58 and 60, resistance weld means 88 shown best in Fig. 9 is formed so that the side seam portions 50 and 52 are securely connected and sealed together. In order to enable the welding operation to proceed at high speeds and without failure, it is important that good electrical contact be established between the electrodes and a can body. In the event metal or particles of tin or the like should flake from a can body and adhere to the roller electrodes, successful welding of succeeding can bodies would be jeopardized since the foreign material on the electrodes may prevent the establishment of good electrical contact. Contamination of the roller electrodes 58 and 60 is prevented by providing the means 40 with a wire electrode 90 of small diameter and great length which is continuously advanced and partially passed around both the upper and lower roller electrodes 58 and 60 so that electrical contact with the can body is provided through successive and substantially clean portions of the wire.

A supply reel 92 for the wire electrode is mounted on a shaft 94 which is rotatably supported by brackets 96 and 98 projecting forwardly from a transverse frame member 100. The wire 90 extends downwardly from the supply reel through a suitable funnel-shaped guide 101 which is supported above the bracket 62 so that its lower outlet end is disposed substantially in the central plane of the roller electrode 58. From the guide 101 the wire extends downwardly and around a lower portion of the roller electrode 58 which is preferably provided with a peripheral groove 102 for accommodating the wire. Then the wire extends forwardly around a pulley 104 which is preferably formed from electrical insulating material and is rotatably supported by a bracket 105. The wire then extends rearwardly from the pulley 104, which pulley is mounted for rotation about an axis inclined with respect to the axis of the electrode 58 so that the wire may pass rearwardly without interfering with the electrode or supporting means therefor. The wire then passes over the frame member 66 and around suitable guide pulley means or combination of guide pulleys of insulating material generally designated by the numeral 106. From the guide pulley means 106 the wire passes downwardly and around a pulley 108 of insulating material rotatably mounted between rearward end portions of the horn members 74 and 76 and then forwardly beneath a similar guide pulley 110 and around the lower electrode 60 which is also provided with a wire accommodating peripheral groove. The wire extends rearwardly from the bottom of the electrode 60 around a pulley 112 similar to and located beneath the pulley 108 and then upwardly between a pair of feed rollers 114 and 116. The feed rollers are driven in timed relationship with the conveyor chain 16 in the manner described below so that the wire at the upper and lower points of contact with a can body side seam is moving at substantially the same lineal speed as the can body. Thus, sliding contact between the wire and a can body is substantially eliminated and, in addition, a fresh increment of the wire electrode is presented to each increment of the advancing can body. From the feed rollers the wire passes through a suitably supported guide 118 to a take-up reel 120. The take-up reel 120 is mounted on a shaft 122 which is rotatably supported by brackets 124 and 126 extending from the frame member 100. The take-up reel is driven in a manner also described below.

A section of the wire 90 passing beneath the roller electrode 58 and contacting a can body may become slightly contaminated. However, the amount of contaminated material such a section of the wire may pick up during engagement with a single can body is usually insufficient to impair unduly the electrical contact between the lower electrode 60 and another can body when this same section of the wire passes over the lower electrode. Therefore, the relationship between the length of the wire between the upper and lower can body contact points and the spacing of successive can bodies is not critical. However, it is preferred that this relationship be such that a section of the wire passing over the roller 60 and engaging a can body will have previously passed around the roller 58 without engaging a can body. Such a relationship eliminates any possibility of an inferior electrical contact between the wire on the lower electrode and a can body.

In order to permit the wire electrode to be re-used, it is passed through a sizing die 130 disposed in advance of the feed rollers 114 and 115. The die 130 has an internal diameter slightly less than the original diameter of the wire 90 so that a small surface portion of the wire is removed by the die whereby to insure removal of any foreign material from the wire. The die 130 is removably mounted by any suitable means such as a bracket 132 to a frame member 134 supported between upstanding frame members 136 and 138. Thus, after each pass of the wire through the die, the die may be removed and replaced by a slightly smaller die so that the wire may be repeatedly re-used until its diameter has been reduced so that it is no longer operative.

The feed rollers 114 and 116 are respectively fixed on shafts 140 and 142 rotatably supported by suitable bearings on arms 144 and 146 secured to a frame member 150. The feed roller shaft 142 is driven from and in timed relationship with the conveyor shaft 20 by suitable means which may include sprockets 152 and 154 on the shafts 20 and 142, respectively, and a drive chain 156. The conveyor shaft 20 may be driven by suitable means including a motor and speed reducing unit 158 having a sprocket 160 on its output shaft, and a chain 162 extending around the sprocket 160 and a sprocket 164 on the shaft 20. The feed roller 114 is driven from the shaft 142 and at the same speed as the feed roller 160 by meshing gears 166 and 168 on the shafts 140 and 142 respectively.

It will be appreciated that the feed rollers 114 and 116 will advance the wire electrode at a substantially constant lineal speed. Therefore, means is provided for driving the take-up reel 120 at varying rotational speeds so that the lineal speed of the surface of the continuously increasing coil of wire on the take-up reel will remain substantially constant. In the embodiment shown, this means comprises a sprocket 170 on the shaft 142 which drives a chain 172 also extending around a sprocket 174 on an input shaft 176 of a slip clutch mechanism 178. The sprockets 170 and 174 are proportioned so that an output shaft 180 of the slip clutch mechanism which is connected with the reel shaft 122 is normally driven at a speed such that the lineal speed of the reel is greater than the lineal speed of the feed rollers. The slipping action of the clutch mechanism serves to maintain the wire leaving the feed rollers under tension and also to permit the speed of the reel to vary as required. The shafts of the clutch mechanism are suitably rotatably supported on arms 182 and 184 extending from the frame member 100.

The reels 92 and 120 are easily removable from their respective supports and are interchangeable so that when the reel 92 is empty, it may be used to replace the reel 120 and vice versa. Any suitable means may be provided for detachably connecting the output shaft of the clutch mechanism with a reel shaft, and in the embodiment shown, this is accomplished by providing the opposite ends of the reel shafts with slots 188 and the end of the clutch shaft 180 with a tongue 190 which is adapted to extend into an adjacently positioned end slot in the take-up reel shaft.

A resume of the operation of the apparatus is as follows. The drive motor unit 158 is energized and the sheet feeding means 28 is actuated by suitable means, not shown, in timed relationship with the conveyor chain so that successive can body blanks 14 are placed on the chain and retained by successive feed dogs 26. As the blanks advance along the path of travel of the chain, their opposite margins are formed or offset and they are progressively bent so that their margins 50 and 52 are slightly spaced apart as they approach the welding station. Then as the bodies are advanced continuously and at a high speed, their margins 50 and 52 are brought into overlapping relationship and are passed between and in engagement with succesive increments of the wire electrode which engage the roller electrodes 58 and 60. A suitable source of electrical energy is provided for the electrodes, which source may include a transformer 192 having one terminal electrically connected to the upper electrode 58 by a cable 194 and another terminal connected with the frame or horn supporting bracket and thus, with the lower roller electrode 60 by a cable 196. The can bodies having their side seam securely welded and sealed are then advanced to the discharge end of the conveyor chain 16 from which they are directed by suitable means, not shown, to additional processing apparatus or to storage facilities or the like.

While the preferred embodiment of the present invention has been shown and described herein, it is obvious that many structural details may be changed without departing from the spirit and scope of the appended claims.

The invention is claimed as follows:

1. An apparatus for making can bodies and the like from blank means moving along a path of travel and for resistance welding side seams of the can bodies or the like, comprising means disposed adjacent said path of travel for forming the blank means and for locating previously spaced longitudinal marginal portions of the blank means substantially in engagement with each other at a predetermined station, elongated resistance welding wire electrode means at said station, means at said station for directing successive increments of a first portion of said wire electrode means against and into electrical contact with successive increments of an outer surface of one of said blank means marginal portions, means at said station for directing successive increments of another portion of said wire electrode means against and into electrical contact with successive increments of an inner surface of one of said blank means marginal portions, and means for guiding said second mentioned wire electrode means portion rearwardly of said station for avoiding interference with blank means advancing to and beyond said station.

2. An apparatus, as defined in claim 1, which includes means for feeding said blank means and said wire electrode means increments engaging the blank means in the same direction and at substantially uniform lineal speeds.

3. An apparatus, as defined in claim 2, wherein said feeding means advances said blank means and said wire electrode increments continuously.

4. An apparatus for making can bodies and the like from a plurality of blanks and for resistance welding side seams of the can bodies or the like, comprising inner and outer peripherally opposed rotatably mounted roller electrodes, means for conveying a series of blanks past said electrodes and for successively shifting initially spaced opposite longitudinal marginal portions into juxtaposition with each other at a location in advance of said electrodes and for directing the juxtaposed marginal portions between said electrodes, elongated wire electrode means extending partially around said roller electrodes for electrically contacting the juxtaposed marginal portions of successive blanks, and means for feeding said wire electrode means for presenting successive increments of the wire electrode means to successive increments of inner and outer surfaces of said juxtaposed marginal portions.

5. An apparatus for making can bodies and the like and for resistance welding side seams of the can bodies, comprising means for conveying a plurality of blanks along a predetermined path of travel, inner and outer peripherally opposed roller electrodes rotatably mounted adjacent said path of travel, means disposed adjacent said path of travel for forming said blanks at a location in advance of said roller electrodes for arranging previously spaced opposite longitudinal marginal portions of the blanks in overlapping relationship, elongated wire electrode means having portions extending partially around said inner and outer electrodes for electrically contacting inner and outer surfaces of overlapping marginal portions of successive blanks, means guiding one portion of the wire electrode to and from locations spaced rearwardly of said first mentioned location for preventing said last mentioned wire electrode portion from interfering with the blanks, and means for feeding said wire electrode portions for presenting successive increments of said wire electrode portions to successive increments of the overlapping blank marginal portions.

6. An apparatus, as defined in claim 5, wherein said wire electrode means comprises a single length of wire.

7. An apparatus for forming can bodies or the like and for resistance welding side seams of the can bodies or the like, comprising conveying means for advancing a series of blanks along a predetermined path of travel, a horn extending along said conveying means, means disposed adjacent said horn for forming successive blanks around the horn to locate opposite longitudinal margins of the blanks in juxtaposition, an inner roller electrode rotatably supported on said horn, an opposed outer rotatably mounted roller electrode, elongated wire electrode means having first and second portions respectively extending partially around said inner and outer roller electrodes for electrically contacting inner and outer surfaces of juxtaposed marginal portions of successive blanks, means for guiding said first wire electrode portion rearwardly of said inner roller electrode for avoiding interference with the blanks, and means for feeding the wire electrode portions for presenting successive increments thereof to successive increments of juxtaposed marginal portions of the blanks.

8. An apparatus, as defined in claim 7, wherein said conveying means and said feeding means advance said blanks and said wire electrode portions continuously and at substantially the same lineal speed.

9. An apparatus, as defined in claim 7, wherein said wire electrode means initially has a predetermined diameter, which apparatus includes means disposed for reducing said predetermined diameter of the wire means increments after they have passed from the roller electrodes for removing any foreign material which may adhere to the wire means.

References Cited in the file of this patent

UNITED STATES PATENTS

| | | |
|---|---|---|
| 771,280 | Smith | Oct. 4, 1904 |
| 1,300,603 | Gravell | Apr. 15, 1919 |
| 1,308,778 | Gravell | July 8, 1919 |
| 2,078,006 | Lockwood | Apr. 20, 1937 |
| 2,177,104 | Gonser | Oct. 24, 1939 |
| 2,444,465 | Peters | July 6, 1948 |

FOREIGN PATENTS

| | | |
|---|---|---|
| 571,401 | Great Britain | Aug. 23, 1945 |